Patented Apr. 12, 1927.

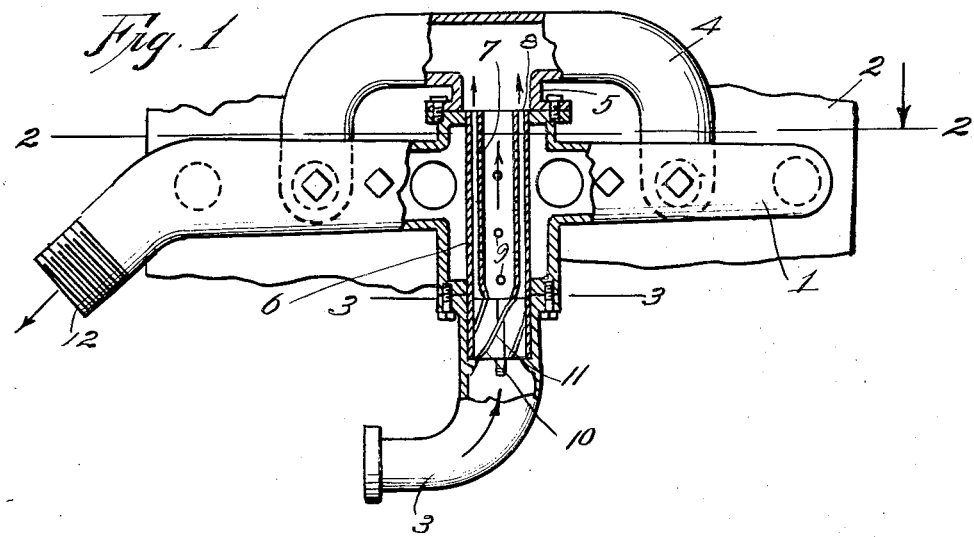
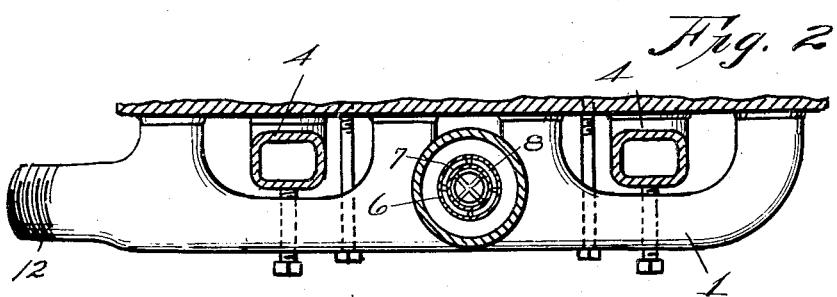
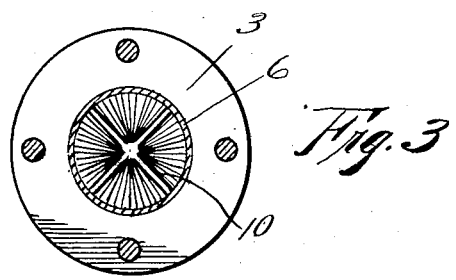

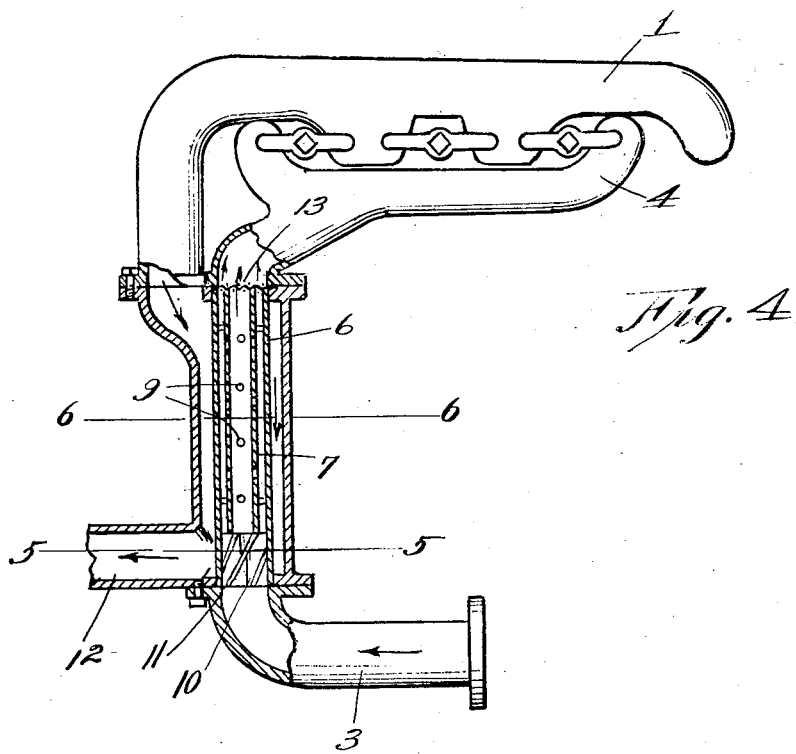
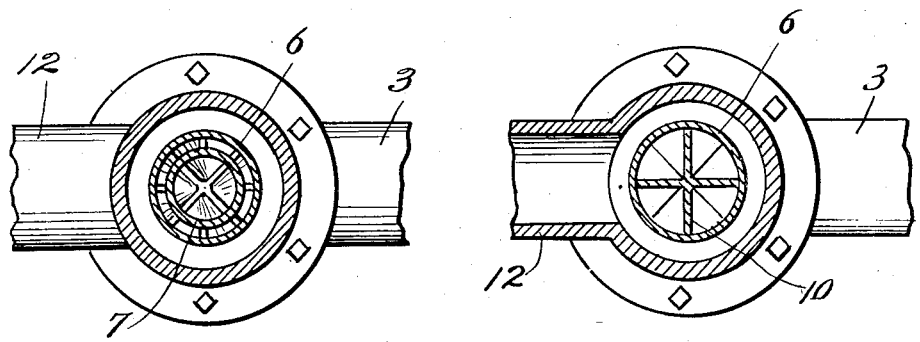

1,624,271

UNITED STATES PATENT OFFICE.

HARRY E. MAY, OF KANSAS CITY, MISSOURI, ASSIGNOR, BY DIRECT AND MESNE ASSIGNMENTS, TO ECONOMY VAPORIZER COMPANY, OF KANSAS CITY, MISSOURI, A CORPORATION OF MISSOURI.

FUEL VAPORIZER FOR INTERNAL-COMBUSTION ENGINES.

Application filed April 1, 1926. Serial No. 99,052.

This invention relates to improvements in fuel vaporizer for internal combustion engines, and refers more particularly to an improved type of fuel vaporizer by means of which an improved combustible mixture is made available for the engine by more completely vaporizing or converting to a gaseous condition liquid fuels such as gasoline, kerosene or other light distillates adaptable to be utilized as a liquid fuel for internal combustion engines.

Among the salient objects of the invention are, to provide a vaporizer by means of which the liquid fuel, which is intimately combined with air in a carburetor is preheated and vaporized and those liquid particles which are not properly volatilized by the dispersing action of the carburetor, are directed to a heating surface receiving its heat from the exhaust gases and thus being completely vaporized prior to the introduction of the mixture to the engine cylinders; to provide a vaporizer which produces a more completely gasified mixture, permitting a better distribution to the individual engine cylinders and one which is particularly adapted to the vaporization and conversion of relatively heavier fuels, improving not only the operation of the engine in the complete utilization of the gaseous mixture during the explosion thereof, and thereby increasing considerably the economy of operation, but also making available to the engine a mixture which considerably improves the function of the engine by decreasing the dilution of the fluid lubricant contained in the crank case, and, in general, to provide an apparatus hereinafter explained in detail.

Fig. 1 is a side elevational view of the device mounted in connection with an exhaust manifold with parts broken away.

Fig. 2 is a view taken along the line 2—2 in Fig. 1.

Fig. 3 is a view taken along the line 3—3 in Fig. 1.

Fig. 4 is a modified type of construction adaptable to certain other makes of cars which have an exhaust manifold of a somewhat different type.

Fig. 5 is a view taken along the line 5—5 in Fig. 4.

Fig. 6 is a view taken along the line 6—6 in Fig. 4, looking in the direction of the arrows.

Referring to Fig. 1, at 1 is shown an exhaust manifold mounted upon an engine block, a portion of which is shown at 2. Three (3) is the intake, to the lower flanged end of which is affixed the carburetor or mixing valve. Above the exhaust manifold is an inverted U shaped distributing pipe 4 having a central connection 5 flanged to the exhaust manifold. This central connection communicates with a vaporizing pipe 6 which extends and connects the intake pipe with the distributing pipe, and prevents mixture of the intake and exhaust gases while permitting a heat transfer between the exhaust gases and the combustible mixture being supplied to the engine cylinders. The two horns of the distributing pipe 4 conduct the fuel mixture to the separate cylinders of the engine not shown. Within the pipe 6 is positioned a secondary sleeve or pipe 7 of a somewhat smaller diameter than the pipe 6, forming an annular space 8 between the outer and inner pipes. The internal sleeve or pipe 7 is held within the pipe 6 by means of lugs, or protrusions not shown, pressed in the surface of the inner pipe so as to contact the outer pipe and held thereby frictionally in position. The lower end of the pipe 7 is slightly tapered to facilitate the passage of the insufficiently vaporized material into the outer annular space about the inner pipe.

This inner pipe may or may not be perforated, as shown at 9, to permit the expansion and passage of gases from the annular space into the inner pipe. Below the inner sleeve 7 is a separating device designated as 10. In the drawings, this separator has been shown as an element having spiral vanes 11 upon its periphery. These spiral vanes are pitched in an outward direction to direct by centrifugal force produced by the velocity of the vapors being drawn by the suction from the engine cylinders to project the heavier gravity material, i. e., the insufficiently volatilized material into the annular space between the inner and outer tubes, while the more completely dispersed or vaporized gaseous mixture will proceed directly through the central tube.

By whirling or projecting these heavier insufficiently vaporized particles into the outer annular space, they are brought in contact with the highly heated inner space of the vaporizing tube 6 and, due to the high temperature, are completely vaporized and pass off out of the top of the annular space where they are mixed with the vapors passing through the central tube 7. It is understood that the exposure of heating surface to the material to be vaporized will be properly proportioned to produce a complete vaporization of the fuel particles and produce sufficient preheating of the vapors without raising them to excessive temperatures which would produce unsatisfactory operation of the engines. Under certain conditions, it may be advisable to insulate the inner tube to the extent that when combined in the fuel distributing pipe 4 the temperature of the mixture will be proper for the most efficient functioning of the engine.

In case fuels other than gasoline, such as the heavier distillates including light gas oil or kerosenes, are used as fuel, the mixture may be started by priming with gasoline and instantly changing over to the heavier fuel or changing the fuel after the engine has become sufficiently heated.

In the modified type of construction, like parts of the apparatus have been marked with like numbers, i. e., "1" is the exhaust manifold, while the number "4" designates the distributing pipe for the combustible gases supplied to the engine cylinders. The intake is shown at 3 as before, the concentrically arranged tubes being again designated as 6 and 7. The separator is 10, with vanes 11, while pipe in each case is designated as 12. A screen 13 shown in Fig. 4 may be positioned above the tops of the tubular passageway to further break up the combustible mixture as it is discharged into the intake manifold.

It is understood that, in place of the separator shown, any suitable type of device or mechanism may be used to produce a whirling of the combustible mixture in order to project the heavier particles by centrifugal motion into the annular space between the outer and inner tubes and permitting the lighter or more completely vaporized mixture to pass directly through the inner tube.

In either form of construction, a screen may be positioned at the top of the tubes 6 and 7.

I claim as my invention:

1. A vaporizer for internal combustion engines, comprising concentrically arranged tubular members, forming concentrically arranged passageways in an exhaust manifold, connections with the combustible fuel supply line and with the manifold to the engine cylinders, independent means for directing the insufficiently vaporized portions of the combustible mixture to the annular space between the concentrically arranged tubes.

2. A vaporizer for internal combustion engines comprising concentrically arranged tubular members, forming concentrically arranged passageways arranged in an exhaust manifold for the passage of the combustible mixture therethrough, directing vanes co-acting with the tubular members and adapted to direct the insufficiently vaporized portion of the mixture to the hottest zone of the passageways.

3. A vaporizer for internal combustion engines comprising concentrically arranged tubular members, forming concentrically arranged passageways in an exhaust manifold for the passage of the combustible mixture therethrough, directing vanes co-acting with the tubular members and adapted to direct the insufficiently vaporized portion of the mixture to the hottest zone of the passageways.

4. A vaporizer for internal combustion engines comprising concentrically arranged tubular members, forming concentrically arranged passageways in an exhaust manifold for the passage of the combustible mixture, directing vanes co-acting with the tubular members and adapted to direct the insufficiently vaporized portion of the mixture through the outer passageway and the more volatile matter through the inner passageway.

5. A vaporizer such as that described in claim 1 having an element adapted to spin the combustible mixture positioned adjacent the point where the mixture enters the concentrically arranged tubes.

6. A vaporizer for internal combustion engines, comprising concentrically arranged tubular passageways, forming unobstructed ducts for the passage of the combustible mixture therethrough, connections with the combustible fuel supply line and with the manifold to the engine cylinders, means for giving the vapors a spinning action prior to their entrance into the concentrically arranged tubes for directing the insufficiently vaporized portions of the mixture to the annular space between the tubes and the more completely vaporized portion to the central tube or duct.

7. A vaporizer for internal combustion engines comprising concentrically arranged tubular members forming concentrically arranged tubular passageways in an exhaust manifold, connections with the combustible fuel supply line and with the manifold of the engine cylinders, independent means for directing the insufficiently vaporized portions of the combustible mixture to the annular space between the concentrically arranged tubes, and insulation between the concentrically arranged passageways.

8. A vaporizer such as that described in claim 1 having insulation between the concentrically arranged tubes.

HARRY E. MAY.